Feb. 9, 1971 R. SHARP ET AL 3,561,301
MACHINE TOOL CONTROL SYSTEMS
Filed Jan. 19, 1968 3 Sheets-Sheet 1

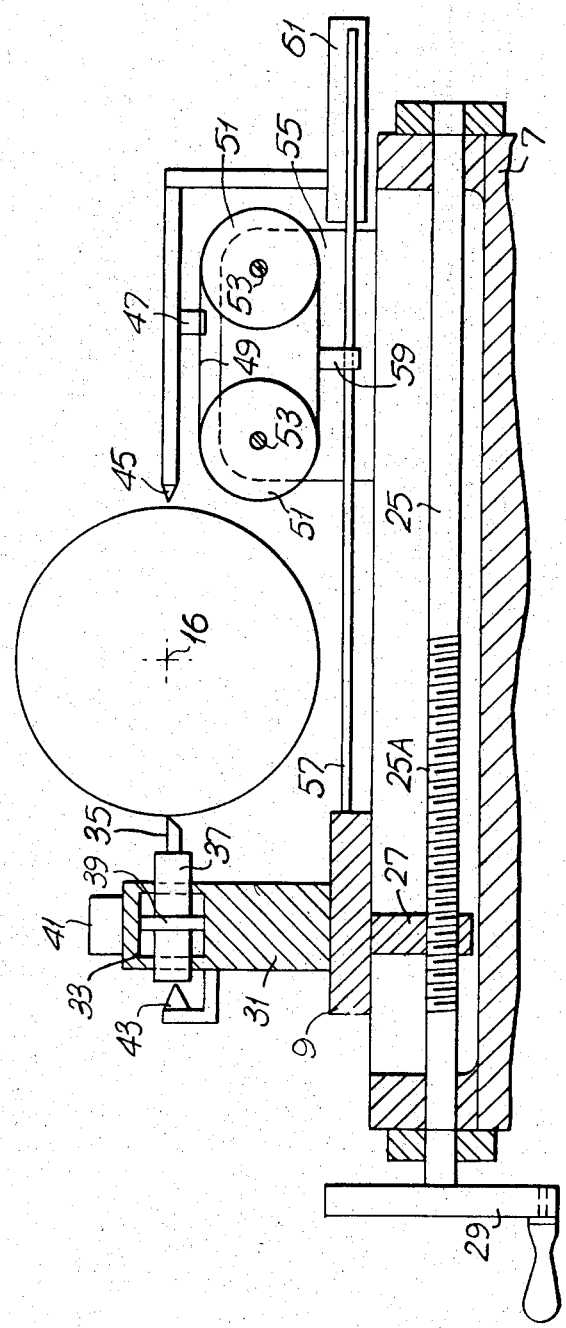
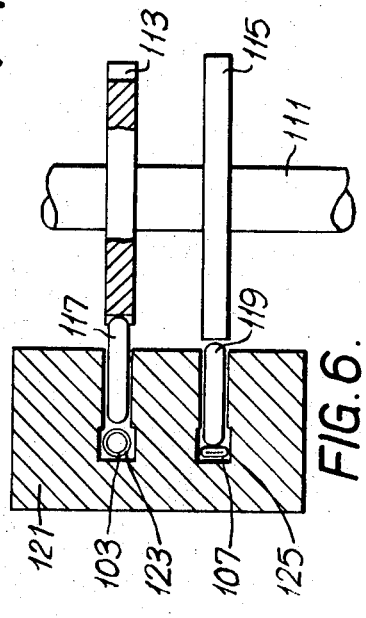
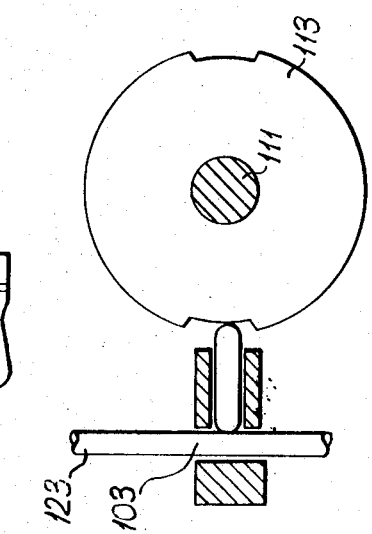
FIG. 2.
FIG. 6.
FIG. 5.

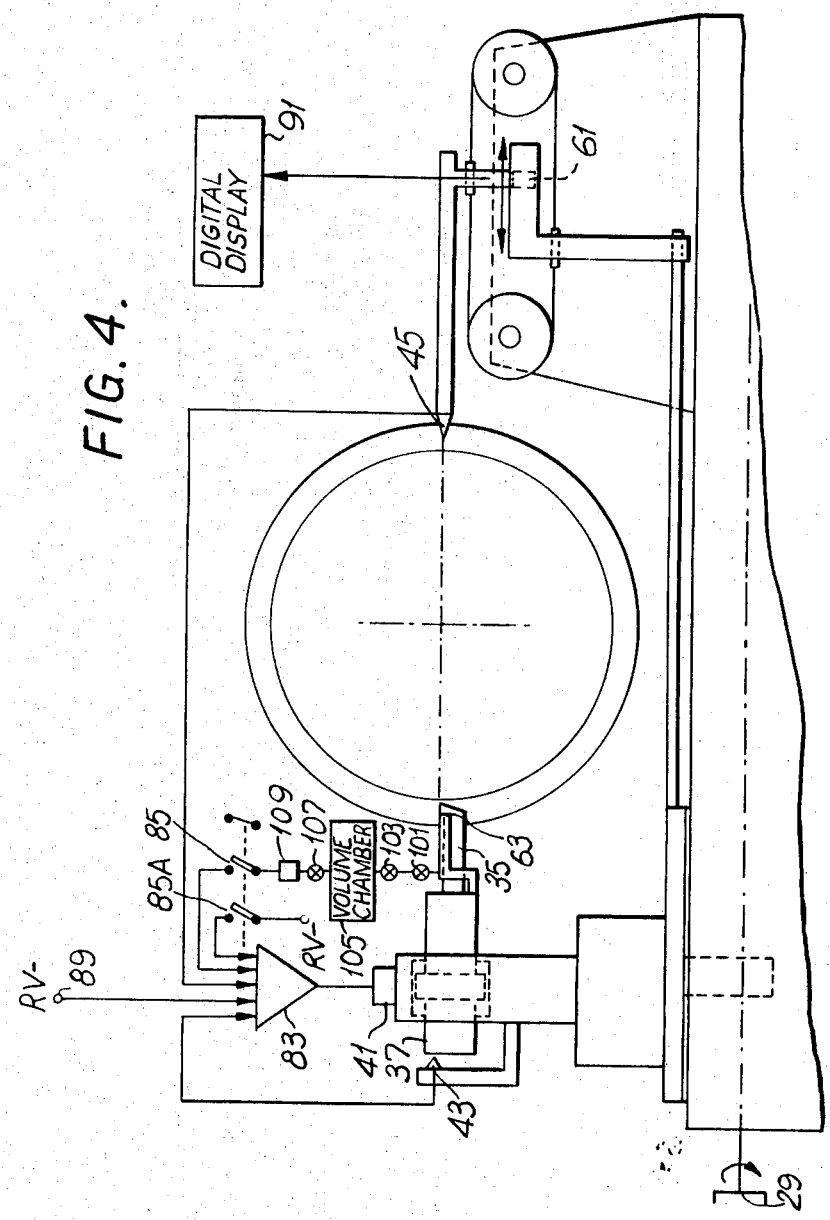

United States Patent Office

3,561,301
Patented Feb. 9, 1971

3,561,301
MACHINE TOOL CONTROL SYSTEMS
Royds Sharp and Malcolm Bath, Glasgow, Scotland, assignors to National Research Development Corporation, London, England, a corporation of Great Britain
Filed Jan. 19, 1968, Ser. No. 699,073
Claims priority, application Great Britain, Jan. 27, 1967, 4,241/67
Int. Cl. B23b 25/06
U.S. Cl. 82—2                               9 Claims

ABSTRACT OF THE DISCLOSURE

A control system for a machine tool comprising a motor by which the tool can be moved radially towards and away from the axis of rotation of a workpiece at such a speed that in use the tool can maintain the circularity of the workpiece even if the workpiece is somewhat eccentric from the axis of rotation, the system including first and second measuring gauges and control means for the motor arranged to combine the outputs of the first and second gauges and to control the motor and so the radial position of the tool in such a manner that the diametrical distance between the part of the workpiece opposite the second gauge and the part of the workpiece acted on by the tool remains substantially constant.

---

This invention relates to improvements in machine tool control systems, and more specifically to the control of the cutting tool acting on the periphery of a rotating workpiece.

In the automatic control of the position of a machine tool to produce a profile determined by an input signal, which may be derived from a template or from a tape recording of a desired cutting programme, it is necessary to monitor the dimension to which the workpiece is reduced by the cutting tool, and to feed information relating to that dimension, or deviations of that measurement from a desired value, to the control device which positions the cutting tool radially of the rotating workpiece.

According to one aspect of the present invention, a control system for a machine tool adapted to act on a workpiece rotatable about an axis of rotation comprises a motor by which the tool can be moved radially towards and away from that axis of rotation at such a speed that in use the tool can maintain the circularity of the workpiece even if the workpiece is somewhat eccentric from the axis of rotation, a first gauge acting on a surface which moves radially with the tool, a second gauge acting on the part of the surface of the workpiece which is diametrically opposite to the part acted on by the tool and acting on the workpiece substantially in the same transverse plane as the tool but on the part of the workpiece which has already been worked on by the tool, and control means for the motor means arranged to combine the outputs of the first and second gauges and to control the motor means and so the radial position of the tool in such a manner that the diametrical distance between the part of the workpiece opposite the second gauge and the part of the workpiece acted on by the tool remains substantially constant.

Preferably the gauges are pneumatic proximity gauges and preferably capillary gauges of the kind described in our copending application Ser. No. 666,038, filed Sept. 7, 1967. However, it is to be noted that use of the latter type of gauge is not critical to the present invention nor is a knowledge of such gauges necessary to a clear understanding of the present invention.

Suitably the motor means is a hydraulic ram and the outputs from the two pneumatic gauges are combined in an amplifier which controls the operation of a servo valve controlling the flow of hydraulic fluid to and from the cylinder of the ram. A third gauge, preferably pneumatic, positioned substantially in the same plane as the axis of rotation and the second gauge can be utilised to provide an indication of the degree of wear of the tool, and this indication can be utilised in the control of the tool to compensate for tool wear.

The invention will now be described, by way of example, with reference to the accompanying diagrammatic drawings, in which:

FIG. 2 is a sectional elevation taken on the line II—II of FIG. 1 and as viewed in the direction indicated by the arrows;

FIG. 4 is a diagrammatic representation of a control system for a tool shown in FIGS. 1 to 3; and FIGS. 5 and 6 are respectively an end elevation and a plan view of cam means for operating two valves shown in FIG. 4.

Figure 1:
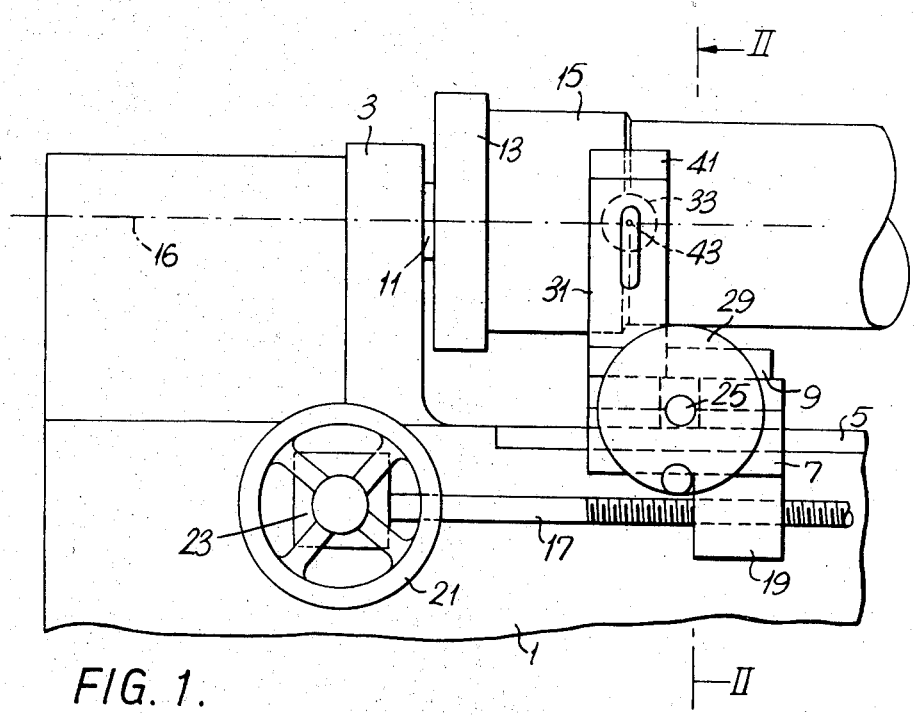
FIG. 1 is a side elevation of part only of a centre lathe to which the invention is applied.
Figure 3:
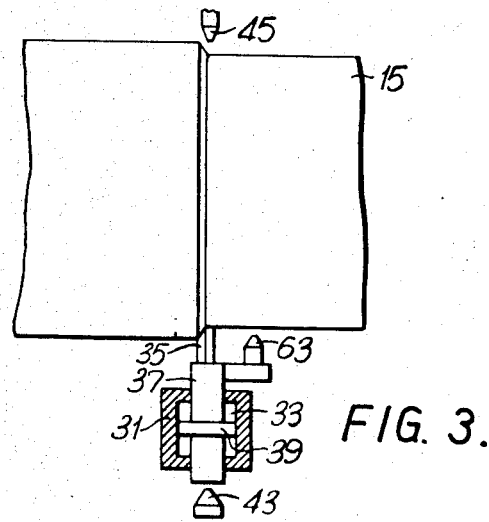
FIG. 3 is a plan view of part only of a workpiece shown in FIG. 1 and of associated tool means and gauging means.

Referring first to FIGS. 1, 2 and 3 the centre lathe includes a bed 1 provided with a headstock 3, a tailstock (not shown), and slideways 5 on which is mounted a saddle 7 carrying a cross slide 9. The headstock 3 provides a mounting for, and driving means for, the headstock spindle 11 on which is mounted a chuck 13 shown as carrying a workpiece 15. The peripheral speed of rotation of the workpiece 15 is about 300 feet per minute. The saddle 7 is movable in a direction parallel to the axis of rotation 16 of the chuck and the workpiece by a lead screw 17 held against axial movement and engaging a nut member 19 fixed on the saddle. The lead screw can be rotated by a handwheel 21 acting through a bevel gear box 23. The cross slide 9 is movable in a direction normal to the vertical plane containing the axis of rotation of the chuck and the workpiece by the engagement of a slide spindle 25 carried by the saddle 7 and held against axial movement, this spindle being screw-threaded over part of its length at 25A and arranged with this screw-threaded part in engagement with a nut 27 provided on the cross slide 9. Spindle 25 is provided at the front end with an actuating handwheel 29.

Fixedly mounted on the cross slide 9 is a tool post 31 the upper end of which is formed with a cylinder 33 directed horizontally towards the axis of rotation 16 of the workpiece, and the cutting tool 35 is mounted on a ram 37 which is provided with a piston 39 which is complementary to the cylinder 33. On top of the tool post is mounted a remotely controlled servo valve 41 arranged selectively to supply hydraulic fluid to, and to exhaust hydraulic fluid from, the two ends of the cylinder 33 respectively on opposite sides of the piston 39. Thus by the action of the servo valve 41 very small adjustments of the position of the tool relative to the tool post can be made, in a direction towards (or away from) the workpiece 15. A pneumatic gauge nozzle 43 is arranged opposite the outer end of the ram 37 and is carried by the tool post 31.

The tool 35 is arranged to engage the workpiece 15 at all times at a point lying in the horizontal plane which contains the workpiece axis 16. Diametrically opposite the tool 35 a pneumatic gauge nozzle 45 is arranged opposite the workpiece 15, this nozzle being clamped by a bracket 47 to an endless steel tape 49 wrapped round two pulleys 51 carried by respective spindles 53 rotatably mounted on a bracket 55 fixedly mounted on the saddle 7. Attached to the cross slide 9 is a rigid rod 57 which is connected by a bracket 59 to a part of the steel tape 49 which is in the oposite run to that to which the bracket 47 is attached. Rod 57 is continued beyond the bracket 59 and this end of the rod serves as the actuating member of a displacement transducer 61, the body of which is fixed to and travels with the pneumatic gauge nozzle 45. It will be seen that with this arrangement any movement of the cross slide 9 will be accompanied by an equal and opposite movement of the second pneumatic gauge nozzle 45, while the setting of the displacement transducer 61 will be an indication of the horizontal distance between the nozzle 45 and the tool post. A third pneumatic gauge nozzle 63 is also carried by the ram 37 at the same level at the tip of tool 35 but displaced a short distance away from the tool tip. It measures the distance from the recently machined surface which is an indication of tool wear since the tip of the tool is touching the member. The tool is being used to make a cut by moving progressively to the left in FIG. 1, and accordingly in that FIG. 1 the gauge nozzle 63 would lie to the right of the tool tip.

Associated with each of the pneumatic gauges 43, 45 and 63 is a transducer which provides an electrical output signal related to the pressure produced in the nozzle.

The components which have been described above are interconnected as shown in FIG. 4, from which it will be seen that positive electrical signals from the pneumatic gauge nozzles 43 and 45 are applied directly as inputs to an amplifier 83 and are balanced in a null position by a negative reference signal at reference signal input 89. The output from the amplifier 83 controls the setting of the servo valve 41. The output from the displacement transducer 61 is applied to a digital read out displacement indicating device 91.

In use of the apparatus described above, the desired diameter for the cut is set by manual adjustment of handwheel 29 until the device 91 indicates the desired diameter. In the amplifier 83, the negative reference voltage on terminal 89 is used to balance the positive signals from the two gauges 43 and 45, ignoring for the moment the effect of the signal derived from pneumatic gauge nozzle 63 (to be described later). When switches 85 and 85A are open, the total output from the amplifier 83 will depend upon the magnitude of the signal on terminal 89, and upon the sum of the two signals respectively from the two pneumatic gauge nozzles 43 and 45. The three signals are combined in the amplifier in such a manner that for a given constant value of the reference signal the servo valve 41 is adjusted when necessary to reposition the ram 37 to keep the sum of the output signals from the two gauges 43 and 45 constant.

If as the workpiece revolves the pressure in gauge nozzle 45 varies cyclically as the clearance between the nozzle and the workpiece varies, then through the action of the amplifier 83 and the servo valve 41 the ram 37 (and thus the tool 35) is automatically moved to preserve the circularity of the cut section.

As a result of thermal drift or distortion of the machine guideways, or misalignment the saddle may, for example, move to the right (in FIG. 2). This will cause the pressure in the nozzle 45 to fall and the ram 37 is automatically moved to the left to increase the pressure in the nozzle so moving tool 35 to the left.

Thus any errors which could be introduced into the workpiece, by relative movement between the workpiece and the tool, e.g. slideway distortion, headstock misalignment, elastic distortion of the machine or the workpiece, or thermal distortion of the machine frame, are eliminated.

With the arrangement shown, the tool 35 and the gauge nozzle 45 effectively form a caliper for the workpiece, since the tool 35 with the ram 37 effectively form a continuation of the workpiece against which the gauge nozzle 43 acts. Since the plane of the caliper is the plane in which the tool acts, the time delay in measuring the diameter of the workpiece (after cutting) is reduced to zero, and since the stability of the control system for the tool 35 is increased with this reduction in time delay, it is possible to use a much higher gain in the control system without introducing instability.

The function of the pneumatic gauge nozzle 63 is to provide for compensation for tool wear. The gauge nozzle 63 is about one inch from the tool tip, and the output signal from this gauge nozzle provides an indication of the state of wear of the tool 35. It does this by measuring the distance from the recently machined surface which is a very close approximation to the position of the tool tip since the tool is touching the surface. The output from the pneumatic gauge nozzle 63 is applied, as an air pressure, through two series connected valves 101 and 103 to a pressure vessel 105, which vessel is connected through a further valve 107 to an electro-pneumatic transducer 109 which provides a positive electrical output signal the magnitude of which is proportional to the applied pneumatic pressure. This signal is applied through the switch 85 as an input to the amplifier 83. A negative reference voltage RV is also applied to the amplifier 83 via a switch 85A ganged with switch 85, this voltage being of such a value as to cancel out the voltage derived from transducer 109 when there is no tool wear.

Valve 101 is manually operated by the machine tool operator, but valves 103 and 107 are controlled automatically. The lathe shown, like most industrial lathes, is provided under the bed 1 with a rack which can coact with pinions carried by the saddle. This rack is used to drive a spindle 111 (FIGS. 5 and 6) which is carried by the saddle 7 and spindle 111 carries two cams 113 and 115. These cams are edge cams having notched peripheries which coact respectively with two rigid plungers 117 and 119 slidably mounted in a block 121 through which extend two flexible pipes 123 and 125. Each cam through its plunger can nip the associated pipe to close the bore therein, or can release the pipe to permit a free flow of air therethrough. These two nipped parts of the pipes 123 and 125 form respectively the two valves 103 and 107. The orientation of the cams is such that (as the saddle 7 moves progressively to the left) if valve 103 is open then valve 107 is shut, and that valve 107 remains shut until valve 103 is firmly shut, whereupon valve 107 opens. It will be appreciated that other forms of cam operated valves can be used instead of the nipped flexible pipes shown.

In operation of the control system shown in FIG. 4, during the initial stages of the first use of the tool, when no information as to tool wear and misalignment can be avalable to the system, the switches 85 and 85A are left open. As soon as gauge 63 is opposite a part of the workpiece which has been machined by the tool 35, the switches 85 and 85A are closed. For the next part of travel of the saddle towards the left in FIG. 1, the valve 107 is closed and the valve 103 is open, so that the pressure in the pressure vessel 105 assumes a more or less steady value representative of the mean value of the pressure in the nozzle 63. Subsequently, e.g. when the saddle has travelled a further two inches, the valve 103 first closes and the valve 107 then opens, so preventing further fluctations in the pressure in the pressure vessel and applying the pressure in the pressure vessel to the transducer 109. This transducer then applies to the amplifier 83 an electrical signal indicative of the tool wear.

It will be appreciated that the tool wear is gradual and there is no need for it to be monitored continuously, so that a measurement of the tool wear in an intermittent manner is sufficient. Once this action of changing the states of the two valves 103 and 107 has commenced, it is repeated in a cyclic manner, the repetition rate of which can be selected by suitable choice of the gearing used to drive the two cams 113 and 115.

Just before the end of each cut is reached, the valve 101 is manually closed by the operator, so ensuring that the pressure stored in the pressure storage chamber 105 will remain indicative of the degree of tool wear at the end of the cut. When the next cut is started, it is not necessary to open the switches 85, 85A. On this further cut, the gauge nozzle 63 will not initially monitor a machined part of the workpiece, and until gauge nozzle 63 is actually effecting a monitoring operation, the valve 101 is closed during this initial part of the movement, and then is opened manually by the operator.

It will be seen that with this arrangement tool misalignment and accumulative tool wear will cause a "ridge" to appear on the workpiece only at the start of the initial cut, and this ridge will be removed automatically on the next cut by the information as to tool wear and misalignment stored in the pressure vessel at the end of the first cut.

The system of FIG. 4 thus compensates for errors which would be introduced by relative movement between the tool and the workpiece, the sample and hold device formed by the combination of pressure vessel 105 and the cyclically operated valves 103 and 107 enabling potential errors arising from tool wear and incorrect tool-setting substantially to be eliminated.

The invention has been described in relation to a centre lathe but clearly has application to many other types of machine tools particularly cutting, boring and reaming tools. As applied to an internal boring tool the cutting tool would be positioned within the bore in the workpiece and air gauges positioned behind the tool post and adjacent the diametrically opposite internal surface of the bore.

One advantage of the invention is that it eliminates the need to employ pre-set tools since the system will take account of any inaccuries in the setting of the tool.

We claim.

1. Machine tool apparatus comprising:
    a workpiece holder adapted to hold a workpiece and to rotate the workpiece about an axis of rotation;
    a tool;
    a tool holder for said tool, including driven means to move said tool radially towards and away from said axis of rotation;
    a first proximity gauge acting on a surface of said tool holder movable radially with said tool under the action of said drive means;
    a second proximity gauge acting on the part of the workpiece surface diametrically opposite to and in substantially the same transverse plane as the tool, but on the part of the workpiece surface which has already been acted on by the tool; and
    control means operative in response to said gauges to activate said drive means for tool movement to maintain substantially constant the sum of the spacings of said gauges from their respective associated surfaces.

2. Apparatus according to claim 1 wherein said gauges are pneumatic proximity gauges.

3. Apparatus according to claim 1 wherein:
    said driven means is a hydraulic ram; and
    said control means includes a summator to combine the outputs from said gauges, and a servo valve to control the flow of hydraulic fluid to and from said ram in response to said summator.

4. Apparatus according to claim 1 comprising:
    a third proximity gauge positioned adjacent said first gauge and in substantially the same plane as said axis of rotation and said second gauge, acting on part of the workpiece surface which has already been acted on by the tool, and movable with said tool, said third gauge serving to provide an output indicating the degree of wear of the tool.

5. Apparatus according to claim 4 wherein said third gauge is a pneumatic proximity gauge.

6. Apparatus according to claim 5 comprising:
    a pressure storage chamber;
    a first valve connecting said third gauge and said chamber;
    a second valve connecting said chamber to said summator; and
    means for operating said valves periodically in sequence.

7. Apparatus according to claim 6 comprising:
    a slide supporting said tool holder and said gauges, said slide being movable in the direction of said axis of rotation;
    and wherein said valve operating mechanism comprises a cam mechanism coupled with said slide to cyclically operate said valves.

8. Apparatus according to claim 5 comprising:
    manually operable switch means to isolate said third gauge at will.

9. Apparatus according to claim 1 comprising means coupling said tool holder and said first gauge on the one hand, and said second gauge on the other hand, for movement towards and away from said workpiece in respectively opposite senses and in unison; and transducer means responsive to the opposed movements of said coupling means.

References Cited

UNITED STATES PATENTS

| | | | |
|---|---|---|---|
| 3,195,383 | 7/1965 | Connelly | 82—21 |
| 3,326,069 | 6/1967 | Lee | 82—21 |

FOREIGN PATENTS

| | | |
|---|---|---|
| 904,730 | 8/1962 | Great Britain. |

LEONIDAS VLACHOS, Primary Examiner

U.S. Cl. X.R.

82—21, 24